United States Patent [19]

Platusich

[11] Patent Number: 4,777,977
[45] Date of Patent: Oct. 18, 1988

[54] COMPOSITE BUTTERFLY VALVE HOUSING

[75] Inventor: Bruce M. Platusich, Elmira, N.Y.

[73] Assignee: ITT Corporation, New York, N.Y.

[21] Appl. No.: 27,060

[22] Filed: Mar. 23, 1987

Related U.S. Application Data

[63] Continuation of Ser. No. 687,609, Dec. 31, 1984, abandoned.

[51] Int. Cl.$^4$ ............................................. F16K 27/00
[52] U.S. Cl. ..................................... 137/375; 251/305; 264/275
[58] Field of Search ................. 137/375; 251/305, 308; 264/275

[56] References Cited

U.S. PATENT DOCUMENTS

| | | | |
|---|---|---|---|
| 713,052 | 11/1902 | Bordo et al. | 137/375 |
| 2,517,311 | 8/1950 | Hill et al. | 137/375 |
| 3,318,567 | 5/1967 | Gifford | 251/306 |
| 3,537,683 | 11/1970 | Snell, Jr. | 264/275 |
| 3,738,383 | 6/1973 | David | 137/375 |
| 3,750,698 | 8/1973 | Walchle et al. | 137/375 |
| 3,857,406 | 12/1974 | Dorling | 137/375 |
| 3,904,173 | 9/1975 | Naylor | 137/375 |
| 3,958,595 | 5/1976 | Al et al. | 137/375 |
| 3,990,675 | 11/1976 | Bonafous | 137/375 |
| 4,103,866 | 8/1977 | Robinson | 251/305 |
| 4,460,620 | 7/1984 | Deters | 264/275 |
| 4,510,965 | 4/1985 | Peroux et al. | 137/375 |
| 4,516,597 | 5/1985 | Ueda | 137/375 |

FOREIGN PATENT DOCUMENTS 2811482 9/1978 Fed. Rep. of Germany ...... 251/305

Primary Examiner—Martin P. Schwadron
Assistant Examiner—Stephen M. Hepperle
Attorney, Agent, or Firm—Menotti J. Lombardi

[57] ABSTRACT

A butterfly valve housing which is to be interposed between two sections of as conduit includes a metallic core body and a covering body of a high-rigidity synthetic plastic material which is molded around the core body to substantially completely encase the same and to form a substantially self-supporting shell around the core body. The core body has and annular portion that bounds an internal opening and two projections which extend radially outwardly from the annular portion. The projections and the annular portion bound transverse passages that are centered on a common axis extending across the internal opening and in use accommodate respective trunnions that support a disc-shaped valve member of the butterfly valve. The covering body has regions which penetrated into these transverse openings to cover the core body within the latter. The core body has two additional projections that are situated between the first-mentioned projections and which have recesses that, during the molding of the covering body around the core body in a molding cavity, receive locating pins that hold the core body in position in the molding cavity. Other locating pins are received in the radially outer ends of the transverse passages during the molding operation to hold the core body in position in the molding cavity.

1 Claim, 3 Drawing Sheets

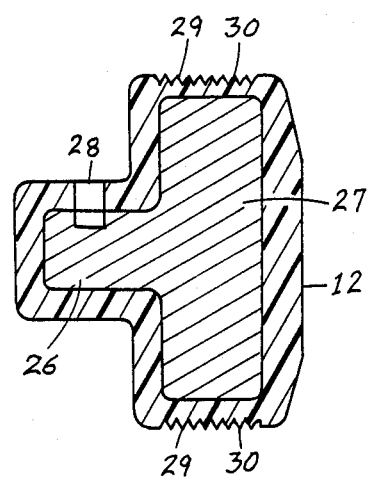

COMPOSITE BUTTERFLY VALVE HOUSING

This aplication is a continuation of application Ser. No. 687,609, filed Dec. 31, 1984, now abandoned.

BACKGROUND OF THE INVENTION

The present invention relates to valves in general, and more particularly to a butterfly valve housing and to a method of manufacturing the same.

There are already known various constructions of butterfly valves and of their housings. So, for instance, it is known so to construct the butterfly valve that its housing is insertable between the flanges of a pipeline, being clamped or otherwise held in position between such flanges. The valve housing is provided with transverse openings wnich are centered on a transverse axis that extends substantially normal to the axis of the pipeline, and which rotatably support a shaft or trunnions supporting a substantially disc-shaped butterfly valve member, so that the latter can be turned through substantially 90° about the transverse axis between its open and closed positions. The valve housing bounds a substantially cylindrical internal opening that is centered on an axis that substantially coincides with the axis of the pipeline, and the disc-shaped butterfly valve member is constructed to fit into this internal opening, there being provided sealing means either on the disc-shaped butterfly valve member, or in the internal opening of the valve housing, or both, to seal the gap between the disc-shaped butterfly valve member and the internal surface of the valve housing at least in the closed position of the disc-shaped butterfly valve member.

In this connection, it has already been proposed, for instance, in the U.S. Pat. No. 3,958,595, to encapsulate the exposed surfaces of the valve housing in a corrosion-resistant polymeric plastic coating layer, this coating layer extending into the transverse openings as well. This coating layer is relatively thin and thus has to be bonded to the underlying surfaces to maintain its shape in conformity with the shape of the underlying surfaces of the valve housing. Experience has shown, however, that during repeated thermal expansion and contraction cycling of the valve housing as it often occurs during the operation of the butterfly valve, because of the usually different coefficients of thermal expansion of the material of the valve housing and that of the coating layer, the aforementioned coating layer may become detached from the underlying surfaces or may crack or even peel off, due to its relative thinness and reliance on the underlying valve housing for support, and aggressive agents may then penetrate to the valve housing and cause corrosion of the latter. Moreover, since the coating layer is so thin, it will track even minute surface irregularities of the underlying portions of the valve housing, so that those regions of the surface of the metallic valve housing where the coating layer is required to be devoid of such irregularities must be machined or otherwise shaped prior to the application of the coating layer to the metallic valve housing, or the coating layer must be machined, thermally sized, or otherwise treated to remove such irregularities from the exposed surface of the coating layer at such regions. In each instance, there is required one or more machining or treating operations to achieve the desired surface quality of the coating layer at the affected region, which makes the manufacture of the valve housing rather time-consuming, cumbersome and expensive.

It is also known, for instance, from the U.S. Pat. Nos. 3,537,683, 3,738,383 and 3,990,675, to completely embed reinforcing rings or other core bodies in outer bodies of an elastomeric sealing material which is molded around such core bodies and may be but not necessarily is bonded thereto, and which does not require, and hence usually does not have, a high-quality surface finish. Because of the elasticity of such materials, the aforementioned problems arising from the differential expansion are not encountered here, but the body of the elastomeric material is incapable of forming a self-supporting shell around the core body. Furthermore, so far this approach has been perceived to be usable only with such elastomeric sealing materials, particularly in view of the fact that the tremendous pressures occurring during injection molding of other types of synthetic plastic materials could break, distort or otherwise damage the core body. Such core bodies are usually supported by pins or similar structures in the respective molds during the molding operation; however, such structures completely obstruct the regions which they engage (typically the valve disc shaft or trunnion openings), not enabling the molded material to reach such regions, so that such regions will be exposed to the environmental influences after the supporting structures have been removed from the molded body following the molding operation. This is particularly deleterious when the above-mentioned transverse openings are used for receiving the supporting pins during the molding operation, as they very often are, since the surfaces bounding such transverse openings are then vulnerable to attack during the use of the valve since they are left uncovered by the molded body.

Finally, it is known, for instance, from the U.S. Pat. Nos. 3,318,567 and 3,904,173, to provide linings, usually of an elastomeric materials, on and adjacent the internal surface of the valve housing which surrounds the internal opening of such valve housing that communicates with the consecutive sections of the pipeline and receives the disc-shaped butterfly valve member. Such linings also usually do not have a high-quality surface finish since they do not require the same due to their elasticity and their attendant capability of conforming in shape to the surfaces with which they come into contact. Moreover, these known linings are incomplete, that is, they do not encase the portions of the valve housing which face the exterior of the valve or even completely those portions which face the flanges of the consecutive pipeline sections. Thus, such exposed portions of the valve housing will remain vulnerable to attacks by environmental influences. Furthermore, problems will be encountered with maintaining such linings in their desired positions. Last but not least, it would be impossible to use this approach in connection with so-called engineering grade synthetic plastic materials, since the very high pressures encountered during the molding of such inner linings would damage the underlying metallic elements.

SUMMARY OF THE INVENTION

Accordingly, it is a general object of the present invention to avoid the disadvantages of the prior art.

More particularly, it is an object of the present invention to provide a valve housing of a butterfly valve which does not possess the disadvantages of the known valve housing constructions.

Still another object of the present invention is so to construct the valve housing of the type here under consideration as to avoid the otherwise existing need for machining a multitude of surfaces, particularly seating surfaces, on a metallic valve housing.

It is yet another object of the present invention so to design the valve housing of the above type as to be relatively simple in construction, inexpensive to manufacture, easy to use, and reliable in operation nevertheless.

An additional object of the present invention is to devise a valve housing of the above type and a method of manufacturing the same which would reduce the need for performing machining operations to a minimum, if not eliminate the same altogether.

A concomitant object of the present invention is to develop a method of manufacturing the valve housing of the above type, which is easy to perform and achieves excellent results particularly as far as the durability of the valve housing during use even under most adverse conditions is concerned.

In pursuance of these objects and others which will become apparent hereafter, one feature of the present invention resides in a valve housing of a butterfly valve which comprises a core body of a rigid metallic material including an annular portion bounding an internal opening, and at least two projections extending radially outwardly of the annular portion, the core body having two transverse openings that are centered on a common axis extending across the internal opening and that respectively pass through the projections and the annular portion into the internal opening; and a covering body of a molded synthetic plastic material of a sufficient thickness to form a substantially self-supporting shell that substantially completely encases the core body and has regions which penetrate into the transverse openings to cover the core body within the latter.

BRIEF DESCRIPTION OF THE DRAWING

Above-mentioned and other features and objects of this invention will become more apparent by reference to the following description taken in conjunction with the accompanying drawings, in which:

FIG. 3 is a sectional view of a detail of the construction of the valve housing, taken on line III—III of FIG. 2.

DETAILED DESCRIPTION OF THE PREFERRED EMBODIMENT

Figure 1:
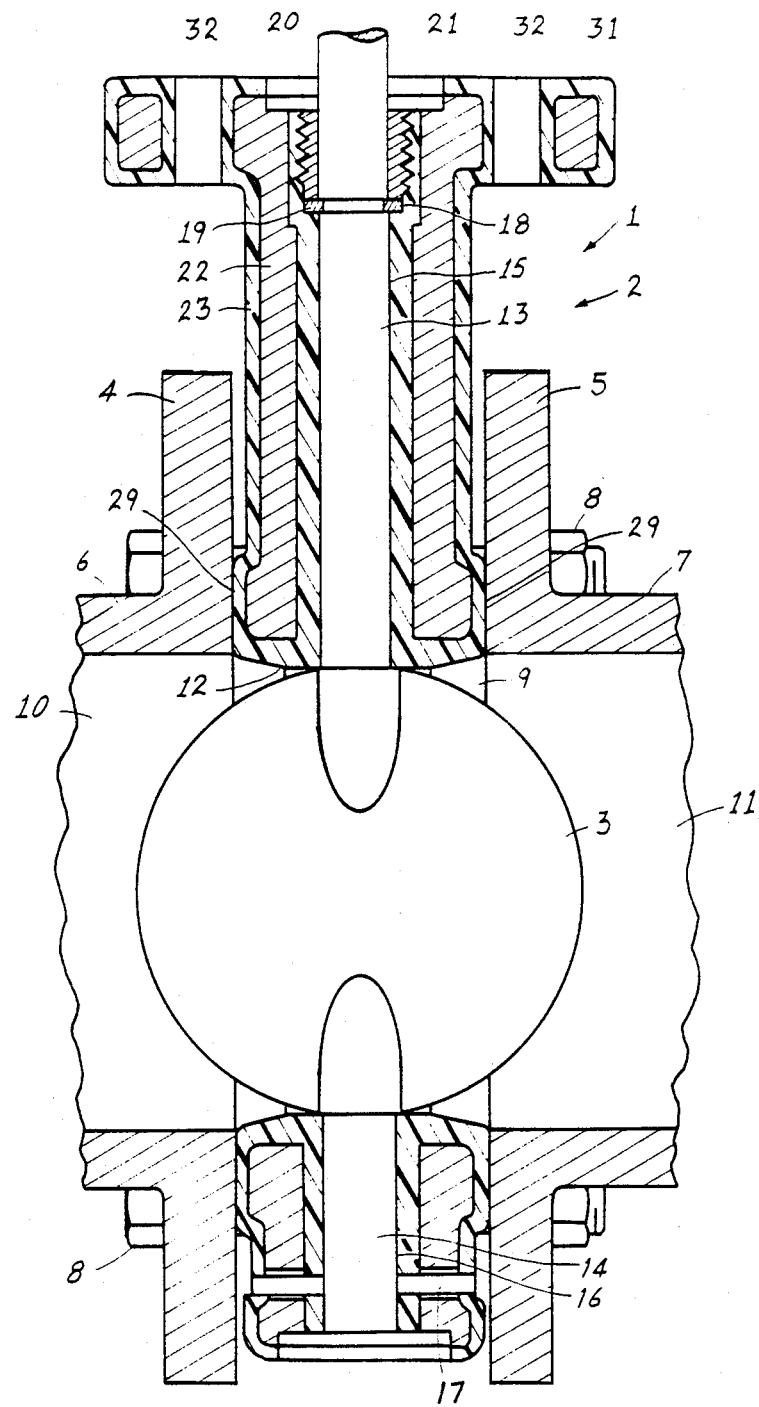
FIG. 1 is an axial sectional view of a butterfly valve constructed in accordance with the present invention, as interposed between two consecutive pipe sections.

Referring now to the drawing in detail, and first to FIG. 1 thereof, it may be seen that the reference numeral 1 has been used therein to identify a butterfly valve constructed in accordance with the present invention, in its entirety. The butterfly valve 1 comprises, as its main constituent components, a valve housing 2 and a disc-shaped valve member 3. The butterfly valve 1 is shown to be interposed between two adjacent flanges 4 and 5 of respective consecutive tubular sections 6 and 7 which may be sections of a pipeline or another conduit. However, it will be appreciated that one or both of the tubular sections 6 and 7 could be outlet or inlet nipples of containers, pumps or the like instead. As shown, the flanges 4 and 5 directly contact the valve housing 2, but it will be understood that sealing gaskets or other sealing elements could be interposed between the valve housing 2 and the flanges 4 and 5 to seal these interfaces if so required by the user or by the properties of the fluids conveyed through the conduit 6 and 7 and/or any regulations governing the conveyance of such fluids. The flanges 4 and 5 are connected to one another, by respective threaded elements 8 as shown, or by other fastening elements, which extend between the flanges 4 and 5 outwardly of the outer periphery of the valve housing 2 and draw the flanges 4 and 5 toward one another, thus confining and holding the valve housing 2 in position between the flanges 4 and 5. The action of the fastening elements 8 in drawing the flanges 4 and 5 toward one another also urges the flanges 4 and 5 against the valve housing 2 at the respective interfaces, thus providing for a sealing action at these interfaces, in a manner that will be explained later.

The valve housing 2 bounds an internal opening 9 which at least substantially registers with respective internal passages 10 and 11 of the tubular sections 6 and 7 such that a substantially unimpeded flow of the fluid being conveyed is obtained between the internal passages 10 and 11 through the internal opening 9 of the valve housing 2 when the disc-shaped butterfly valve member 3 is in its open position which is depicted in FIG. 1 of the drawing. The disc-shaped valve member 3 is mounted in the valve housing 2 for angular displacement through at least 90° about a transverse axis which extends across the internal opening 9 substantially centrally thereof. The disc-shaped valve member 3 is of a conventional construction and hence need not be discussed herein in any great detail. Suffice it to say that the periphery of this disc-shaped valve member 3 is in a sealing contact with an internal surface 12 bounding the internal opening 9 of the valve housing 2 and that it extends along a plane which includes the transverse axis, so that the disc-shaped valve member 3 is substantially normal to the axis of the internal opening 9 of the valve housing 2 in its closed position and sealingly contacts the internal surface 12 all around its periphery in this closed position thereof. As the valve member 3 is angularly displaced between its above-mentioned closed and open positions, it will obstruct to a greater or lesser degree the passage of the fluid to be conveyed between the internal passages 10 and 11 of the tubular sections 6 and 7 through the internal opening 9 of the valve housing 2. All this, including the sealing of the interface between the outer periphery of the valve member 3 and the internal surface 12, is accomplished in a manner well known to those active in this field.

The mounting of the disc-shaped valve member 3 for the angular displacement discussed above is accomplished by means of two trunnions 13 and 14 which are received in respective transverse openings 15 and 16 of the housing 2 that are centered on the aforementioned transverse axis. However, with only slight modifications, the two trunnions 13 and 14 could be replaced by a continuous shaft passing through or by the disc-shaped valve member 3 along the transverse axis and connected to the valve member 3 for joint rotation. Even when the two separate trunnions 13 and 14 are being used, the disc-shaped valve member 3 could be connected to both of them for such joint rotation or turning. Yet, in the illustrated case, the disc-shaped valve member 3 is connected for joint rotation only to the trunnion 13. On the other hand, the trunnion 14 is held in its associated transverse opening 16 against displacement at least in the axial direction of the transverse opening 16 but, as shown, also against displacement in the circumferential direction. This is accomplished by using a retaining pin 17 which extends through the valve housing 2 and also through the trunnion 14, being received in respective aligned apertures of the same. The trunnion 14 engages the disc-shaped valve member 3 and mounts the same for the aforementioned angular displacement. On the other hand, the trunnion 13 causes the disc-shaped valve member 3 to perform such angular displacement. To this end, as already mentioned before, the trunnion 13 is connected with the disc-shaped valve member 3 in any known manner which prevents relative angular displacement between the two about the transverse axis on which the trunnion 13 is centered, but possibly also against relative displacement in the axial direction of the trunnion 13. As shown, however, the trunnion 13 is prevented from conducting movement in the axial direction by being provided by a radially outwardly extending ridge 18, which is preferably constituted by a split resilient ring that is received in a corresponding circumferential groove of the trunnion 13, the ridge 18 being accommodated between a shoulder 19 of the valve housing 2 and an externally threaded plug 20 that is threaded into an enlarged end portion 21 of the valve housing 2 which is provided with a mating internal thread 22.

Figure 2:
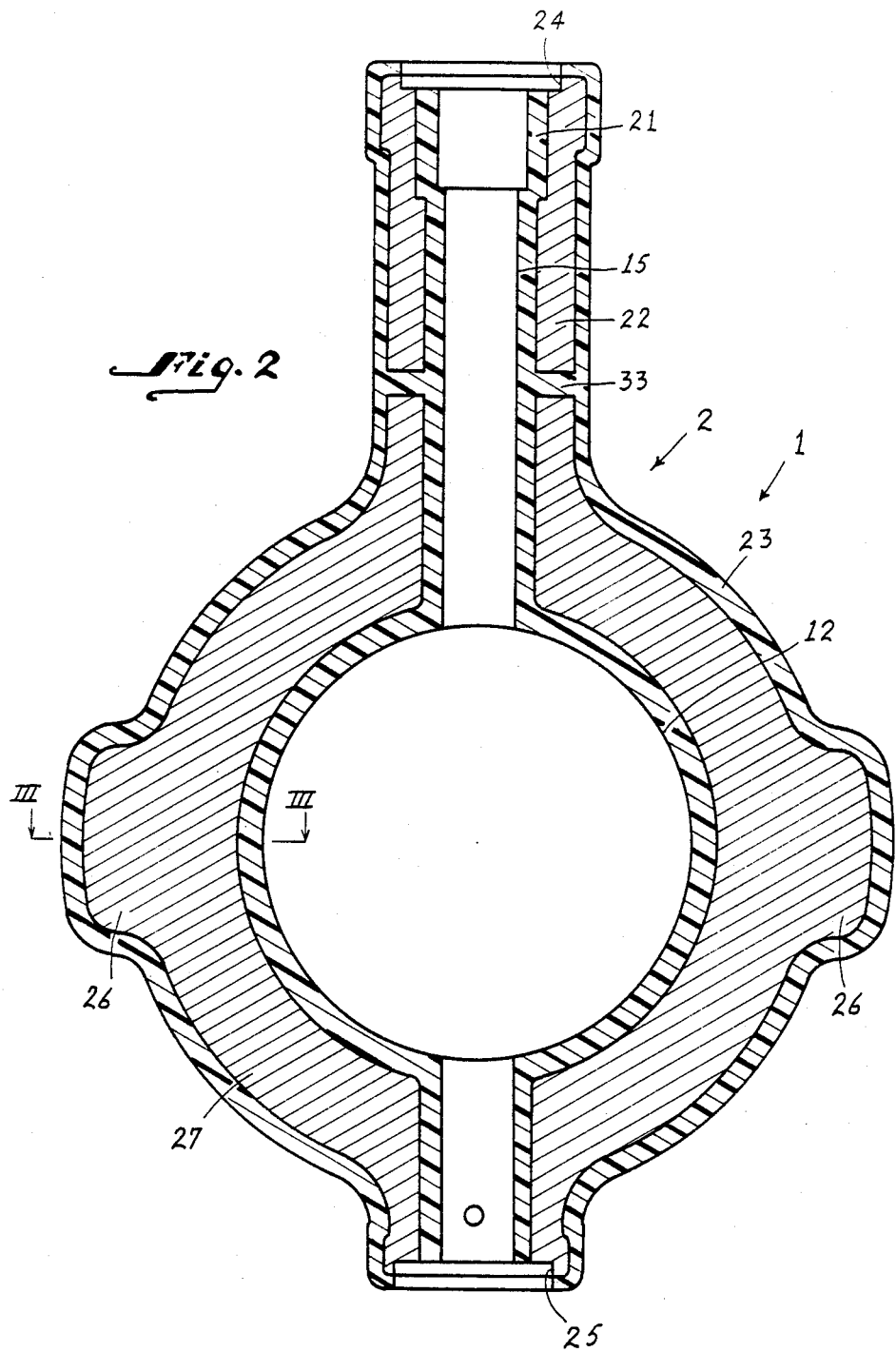
FIG. 2 is a cross-sectional view of only the valve housing of the butterfly valve of FIG. 1, as constructed in accordance with the present invention.

As will become apparent from a comparison of FIGS. 1 and 2 with one another, the valve housing 2, which is shown by itself in FIG. 2, includes a core body 22 which may be of cast iron, gray iron or other suitable metallic material of a substantial rigidity, and a covering body 23 which substantially completely encases the core body 22. The covering body 23 is made of a so-called engineering grade synthetic plastic material such as, for instance, Celcon (trademark of the Celanese Corp.) which is preferably filled with glass beads to the extent of approximately 25%, polypropylene, Noryl (trademark of the General Electric Corp.), Kynar (trademark of the Pennwalt Corp.), or nylon 11 which is preferably glass-bead filled to the extent of about 30%. However, other similar synthetic plastic materials of similar properties could also be used instead. These materials have a substantial strength and wear-resistance in their final state, and also render it possible to obtain relatively smooth surfaces, but they have to be injection molded at relatively high pressures (such as in the range of 10,000 to 15,000 psi.). When it was attempted to mold these materials merely as linings within the internal passage of the valve housings of known constructions, it was established that these pressures are too high to be handled by the metalic material of the valve housing, so that the valve housings would burst or be otherwise damaged during the molding operation. Now, according to the present invention, the covering body 23 is not provided as a mere lining confined to the passage 9 of the valve housing 2 and its immediate vicinity. Rather, the covering body 23 covers substantially all of the exposed surfaces of the core body 22, both at the exterior of the core body 22, and in its interior, that is, within the passage 9 and within the transverse openings 15 and 16. Under these circumstances, the pressure of the flowable synthetic plastic material which is to constitute the covering body 23 is simultaneously applied to the core body 22 during the injection molding operation from the exterior and from the interior of the core body 22, such pressures substantially compensating for one another or cancelling each other out as far as their effect on the core body 22 is concerned, so that the danger of imposing undue stresses on the core body 22 which could result in the occurrence of structural damage in the latter is avoided.

During the injection molding operation which results in the formation of the covering body 23, the core body 22 is supported in the mold by respective positioning pins which are received in respective recesses 24 and 25 of the core body 22 and substantially fill the same. Moreover, as shown in detail in FIG. 3 of the drawing, at least one ear or lug 26 of the core body 22 which extends radially outwardly beyond the periphery of an annular portion 27 of the core body 22, but preferably each of two such ears or lugs 26 which are shown in FIG. 2, is provided with another recess or bore 28 which, during the injection molding operation, receives a positioning pin that also substantially fills the recess 28. These positioning or locating pins then support the core body 22 in the mold during the injection molding operation and prevent the core body 22 from onducting any movement within the molding cavity. Of course, such locating pins also prevent the material being molded from penetrating into the recesses 24, 25 and 28, but this does not adversely affect the structure of the valve housing 2, since such regions of the covering body 23 which are aligned with these regions and hence are devoid of the molded synthetic plastic material are all situated remotely from the passage 9 and hence are not reached by the fluid being conveyed through the valve housing 2. Moreover, if so desired, at least the respective region aligned with the recess 28 could be plugged up or otherwise filled with a body of a sealing material, to prevent access of the ambient air to the core body 22 at this region.

The molded covering body 23 serves several purposes during the use of the valve body 2. First of all, it provides a protective barrier which prevents the fluid being conveyed through the passage 9 as well as the ambient atmosphere from reaching the core body 22. This is renders it possible to choose the material of the core body 22 without regard to the possibility of attack either by the fluid being conveyed or the ambient atmosphere. Secondly, the covering body 23 can have relatively smooth exposed surfaces regardless of the quality of the underlying surfaces of the core body 22, since the covering body 23 has a sufficient thickness not to let any irregularities of such underlying surfaces to influence the quality of the exposed surfaces thereof. This means that the core body 22 need not be machined in any manner after having been, for instance, cast, at a considerable saving in terms of machining time and human effort. On the other hand, the relative smoothness of the exposed surfaces of the covering body 23 renders it possible to use these surfaces as molded as bearing surfaces for the trunnions 13 and 14 (surfaces 15 and 16) and as a valve seat surface (surface 12) for the disc-shaped valve member 3, without any need for machining or otherwise shaping such surfaces 15, 16 and 12 subsequent to molding, except for possible smoothing of respective edges to remove flashings and other undesirable irregularities of such edges. Furthermore, such exposed surfaces, because of their smoothness as molded, and because the synthetic plastic material having such exposed surfaces exhibits resiliency, albeit possibly a quite limited one, are suited for providing a sealing effect at the respective interfaces with other parts of the butterfly valve 1 and/or with the flanges 4 and 5 of the pipe sections 6 and 7.

In this respect, it is to be mentioned that, as illustrated in FIG. 3, exposed surfaces 29 of the covering body 23, which face the end faces of the flanges 4 and 5 in the operative condition of the butterfly valve shown in FIG. 1, are advantageously provided with serrations 30. These serrations 30 are advantageously constituted, in accordance with the present invention, rather than by a single spiral ridge adjoined by a correspondingly spiral valley, by separate circumferentially complete ridges and intervening valleys. In this manner, each of the ridges and adjoining valleys of the serrations 30 constitutes a circumferentially complete section of a labyrinth seal when the ridge is pressed against the end face of the adjoining flange 4 or 5, or against an intervening separate sealing element, such as a gasket.

As shown in FIG. 1, the valve housing 2 can be provided with a flange 31 at the end of the transverse bore 15. This flange 31 is shown to be provided with through openings 32, which are also internally covered by portions of the covering body 23 and which serve for accommodating at least portions of the stems of threaded fastening elements that are used to connect an actuating arrangement of any known construction to the valve housing 2. Such an actuating arrangement would then turn the trunnion 13, when energized, in the desired direction and to the desired extent to achieve the desired change in the position of the disc-shaped butterfly valve member 3 in the passage 9. However, it will be appreciated that such a separate actuating arrangement need not be provided in all instances and that a simple handle could be provided on the upper free portion of the trunnion 13 as considered in the drawing, for manually turning the trunnion 13 in the desired direction and to the desired extent. In this case, the valve housing 2 could be modified by omitting the flange 31, or the flange 31 could be used for connecting a simple cover to the valve housing 2.

FIG. 2 also shows that the core body 22 can be provided witn at least one, but advantageously with more than one, aperture 33 which passes through that wall section of the core body 22 which surrounds the transverse opening 15. During the injection molding operation during which the covering body 23 is being formed, this aperture 33 serves to let the material being molded penetrate into the interior of such wall section from the exterior thereof, thus achieving relatively quick pressure equalization or compensation across this wall section during the injection molding operation, and avoiding the otherwise existing possibility that the external pressure exerted by the material being molded on this wall section without the counteraction of a corresponding internal pressure, could internally collapse this wall section. It ought to be realized in this context that this wall section has a considerable axial dimension, so that it is possible that, were it not for the provision of the aperture or apertures 33, the material being injection molded would not be able to penetrate from the region underlying the surface 12 deep enough into the space bounded by this wall section in time to provide this countervailing pressure and thus to prevent the aforementioned collapse of this wall section.

Finally, it is to be mentioned that the material of the covering body 23 need not be necessarily compatible with the material of the core body 22. So, for instance, the material of the covering body 23 need not adhere to the material of the core body 22 and the coefficients of thermal expansion of these materials may differ from one another. As a matter of fact, there may even be a slight spacing or gap between these materials at least prior to the assembly of the butterfly valve 1 and its incoproration between the tubular sections 6 and 7, or at regions which are not subjected to forces urging the material of the covering body 23 against the core body 22. This spacing or gap may be caused, for instance, by differential contractions of the material of the covering body 23, on the one hand, and of the material of the core body 22, on the other hand. Now, since the covering body 23 substantially completely separates the core body 22 from the ambient atmosphere (with the possibility of removing the few remaining vulnerable areas by sealingly plugging the same) and completely separates the core body 22 from the fluid being conveyed, even the presence of this gap will not result in an increased danger of deterioration of the material of the core body 22 (such as rusting thereof). On the other hand, since the core body 22 and the covering body 23 are formed separately and remain separate from one another, with the covering body 23 having been formed around the core body 22 at an elevated molding temperature, the core body 22 and the covering body 23 will be able to expand and contract independently of one another during their thermal cycling encountered in use of the buttefly valve 1, so that the possibility of cracking of the covering body 23 due to such differential expansion is eliminated.

While I have described above the principles of my invention in connection with specific apparatus, it is to be clearly understood that this description is made only by way of example and not as a limitation to the scope of my invention as set forth in the objects thereof and in the accompanying claims.

I claim:

1. A valve housing comprising:

a core body of a rigid metallic material including an annular portion bounding an internal opening, said annular portion being formed with two tubular projections extending radially outwardly thereof, each of said tubular projections defining cylindrical openings transverse to the axis of said internal opening, said tubular projections having recesses on their free ends, said annular portion further including transverse openings that register with said cylindrical openings, said cylindrical and transverse openings being aligned on a common axis, and at least one of said tubular projections having at least one pressure equalizing aperture therethrough for equalizing pressure between portions of said at least one tubular projection in fluid communication with at least one of said transverse openings and portions of said at least one transverse tubular projection external thereto, said annular portion being further formed with two lugs extending radially outwardly thereof, said lugs being formed with recesses;

a covering body of a molded synthetic plastic material requiring molding pressures of at least 10,000 psi and having rigidity and thickness to form a shell which is substantially self-supporting independently of said core body, said covering body substantially completely encasing both the inner and outer exposed surfaces of said core body including said annular portion, said tubular projections and said lugs and filling said at least one pressure equalizing aperture to provide a protective covering for said core body which remains effective despite differing coefficients of expansion of said core body and covering body and equalizing pressure on said core body during molding, said at least one pressure equalizing opening providing access by said synthetic plastic material during molding to said inner exposed surfaces;

said covering body has exposed annular end faces which, in use of the valve housing, face corresponding surfaces of section of conduit in which the valve housing is incorporated, said exposed annular end faces having circumferentially extending complete annular ridges and intervening valleys thereon for establishing labyrinth seal sections during the use of the valve housing; and at least one of said projections has said at least one through aperture therein for the passage of the material of the covering body therethrough during the molding operation of the covering body from the exterior of the core body into the respective transverse opening, said at least one aperture when filled by said synthetic plastic material forms at least one connecting rib between a part of the shell covering the outer surface and a part covering the inner surface of said core.

* * * * *